(12) United States Patent
Ichikawa et al.

(10) Patent No.: US 11,237,644 B2
(45) Date of Patent: Feb. 1, 2022

(54) CHARACTER INPUT DEVICE, CHARACTER INPUT METHOD, AND CHARACTER INPUT PROGRAM STORED ON COMPUTER-READABLE STORAGE MEDIUM

(71) Applicant: OMRON Corporation, Kyoto (JP)

(72) Inventors: Kei Ichikawa, Ibaraki (JP); Mieko Yamauchi, Kusalsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/173,458

(22) Filed: Feb. 11, 2021

(65) Prior Publication Data

US 2021/0286442 A1  Sep. 16, 2021

(30) Foreign Application Priority Data

Mar. 10, 2020  (JP) .............................. JP2020-040633

(51) Int. Cl.
*G06F 3/023* (2006.01)
*G06F 40/274* (2020.01)

(52) U.S. Cl.
CPC .......... *G06F 3/0237* (2013.01); *G06F 40/274* (2020.01)

(58) Field of Classification Search
CPC .............................. G06F 3/0237; G06F 40/274
USPC ....................................................... 715/261
See application file for complete search history.

(56) References Cited

U.S. PATENT DOCUMENTS

| 7,506,254 | B2* | 3/2009 | Franz | G06F 40/274 |
| | | | | 715/259 |
| 8,307,281 | B2* | 11/2012 | Ueda | G06F 40/274 |
| | | | | 715/264 |
| 8,457,946 | B2* | 6/2013 | Kuo | G06F 40/129 |
| | | | | 704/2 |
| 2010/0146386 | A1* | 6/2010 | Ma | G06F 3/018 |
| | | | | 715/261 |

(Continued)

FOREIGN PATENT DOCUMENTS

| JP | 2013-254259 A | 12/2013 |
| JP | 2013254259 A | * 12/2013 |

OTHER PUBLICATIONS

Pasha, Muhammad. "Efficient Query Construction and Refinement in Web Search Engines." Bahria University, 2015. Research Gate (Year: 2015).*

*Primary Examiner* — Stephen S Hong
*Assistant Examiner* — Broderick C Anderson
(74) *Attorney, Agent, or Firm* — Metrolex IP Law Group, PLLC

(57) ABSTRACT

A character input device according to one or more embodiments may include a controller including a suggestion controller and a display controller, and a database. The database stores a normal predictive conversion suggestion, a group including a plurality of group conversion suggestions each having a common element, and a symbol representing an attribute that classifies the plurality of group conversion suggestions by a characteristic different from the common element in the group. The suggestion controller may detect a reading of an input character and detects, in response to the reading of the input character at least partially matching a name of the group, the symbol representing the attribute of the group. The display controller may display the normal predictive conversion suggestion and the symbol.

18 Claims, 9 Drawing Sheets

(56) References Cited

U.S. PATENT DOCUMENTS

| | | | |
|---|---|---|---|
| 2012/0220275 A1* | 8/2012 | Wakasa | G06F 16/3322 |
| | | | 455/414.1 |
| 2013/0041890 A1* | 2/2013 | Nakayama | G06F 40/274 |
| | | | 707/722 |
| 2017/0024424 A1* | 1/2017 | Almohizea | G06F 16/248 |
| 2017/0277737 A1* | 9/2017 | Singh | G06F 16/2228 |
| 2020/0285324 A1* | 9/2020 | Akimoto | G06F 40/30 |
| 2020/0394210 A1* | 12/2020 | Shazeer | G06F 16/951 |

\* cited by examiner

CHARACTER INPUT DEVICE, CHARACTER INPUT METHOD, AND CHARACTER INPUT PROGRAM STORED ON COMPUTER-READABLE STORAGE MEDIUM

CROSS-REFERENCE TO RELATED APPLICATION

This application claims priority to Japanese Patent Application No. 2020-040633 filed on Mar. 10, 2020, the contents of which are incorporated herein by reference.

FIELD

The disclosure relates to a technique for displaying conversion suggestions for an input character string for a user.

BACKGROUND

Patent Literature 1: Japanese Unexamined Patent Application Publication No. 2013-254259 ("Patent Literature 1") describes a Chinese character (kanji) converter. The kanji converter described in Patent Literature 1 stores category information indicating an attribute of each application program. The kanji converter described in Patent Literature 1 determines the order of conversion suggestions to appear based on the category information.

SUMMARY

However, such a known kanji converter described in, for example, Patent Literature 1 cannot easily allow a user who poorly remembers an intended character string (e.g., a proper noun) to input the character string.

One or more embodiments may be directed to a technique for allowing a user who poorly remembers the reading of an intended character string to easily input the character string.

A character input device according to one or more embodiments may have the structure described below.

A database may store a normal predictive conversion suggestion, a group including a plurality of group conversion suggestions each having a common element, and a symbol representing an attribute that classifies the plurality of group conversion suggestions by a characteristic different from the common element in the group. A suggestion controller may detect a reading of an input character and detects, in response to the reading of the input character at least partially matching a name of the group, the symbol representing the attribute of the group.

With the above structure, when an intended character string is unclear and the group name including the character string is clear, the attribute of the intended character string may be detected based on the group name, allowing selection of a group conversion suggestion associated with the attribute and corresponding to the intended character string.

The character input device may further include a display controller that displays a normal predictive conversion suggestion detected by the suggestion controller on a display screen. The database may store the symbol for selecting the attribute. The suggestion controller may detect the attribute and the symbol. The display controller may display the normal predictive conversion suggestion and the symbol.

The suggestion controller included in the character input device may detect the plurality of group conversion suggestions associated with the attribute of the group in response to the symbol being selected. The display controller may display the plurality of group conversion suggestions detected by the suggestion controller.

The display controller included in the character input device may display readings of the plurality of group conversion suggestions.

The display controller included in the character input device may display the symbol at a predetermined position on the display screen.

The display controller included in the character input device may display the symbol in an emphasized manner.

The suggestion controller included in the character input device may detect, in response to the reading of the input character matching a plurality of attributes of a single group, symbols representing the plurality of attributes.

The database included in the character input device may store the attribute classified into levels.

One or more embodiments may allow a user who poorly remembers the reading of an intended character string to easily input the character string.

DETAILED DESCRIPTION

One or more embodiment are described with reference to the drawings.

Example Use

Figure 2:
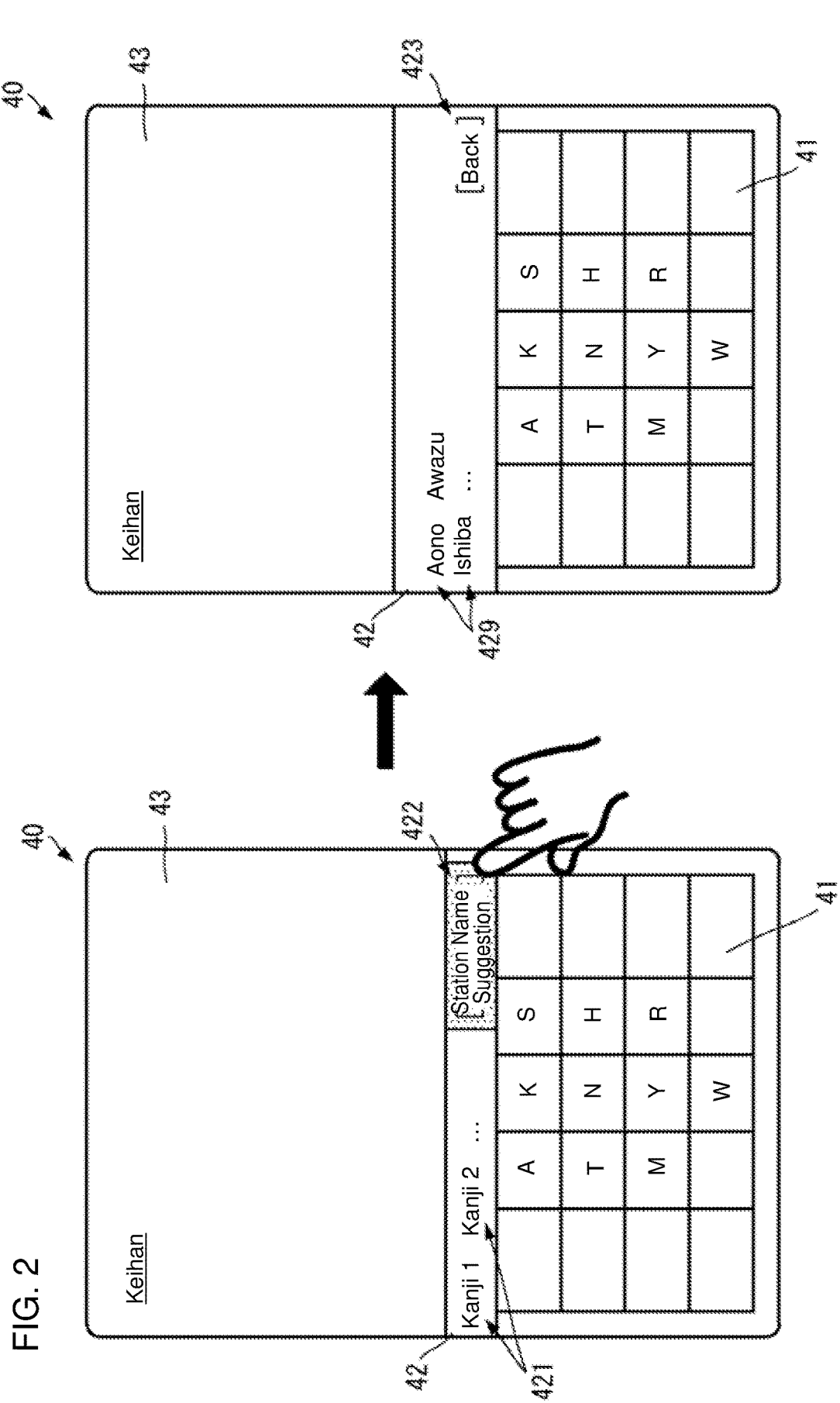
FIG. 2 is a diagram illustrating an example display with a character input method according to a first embodiment.

FIG. 2 is a diagram illustrating an example display with a character input method according to a first embodiment.

A user (character inputter) inputs Japanese hiragana characters (reading of a character string) relevant to an intended character string by operating a keypad display area 41 on a display 40. The display 40 includes a character display area 43 displaying input characters, and a suggestion display area 42 displaying normal predictive conversion suggestions 421 for the input characters and a symbol 422 representing an attribute associated with a group that matches the reading of the input characters.

In response to the user selecting the symbol 422, the suggestion display area 42 displays group conversion suggestions 429 included in the group and associated with the attribute corresponding to the symbol 422.

The user may input an expected character string (intended character string) by selecting one of the group conversion suggestions 429.

In the example shown in FIG. 2, the group is a railroad company, and the attribute is a station name. In response to an input of a railroad company name (e.g., Japanese hiragana characters Keihan) performed by the user who has forgotten an intended station name, the symbol (Station Name Suggestion) 422 representing station names of the railroad company appears. In response to selection of the symbol, the station names of the railroad company (the name of an intended station) appears as conversion suggestions. The user who does not remember an intended station name may thus select the intended station name by simply inputting the railroad company name.

Structure

First Embodiment

Figure 1:
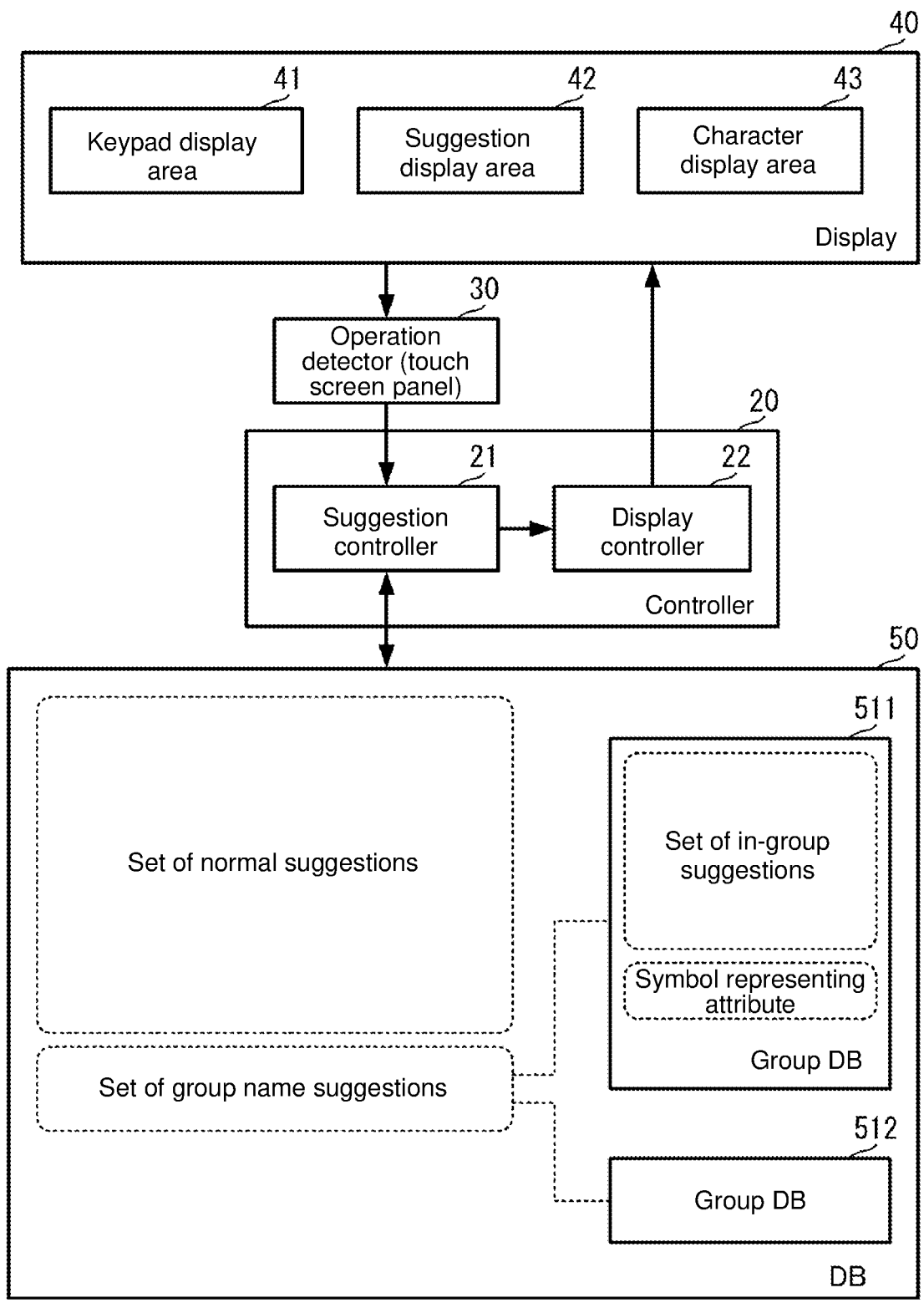
FIG. 1 is a functional block diagram illustrating a character input device according to one or more embodiments.

A character input technique according to a first embodiment is described with reference to the drawings. FIG. 1 is a functional block diagram illustrating a character input device according to one or more embodiments. As described above, FIG. 2 is a diagram illustrating an example display with a character input method according to a first embodiment.

As shown in FIG. 1, a character input device 10 includes a controller 20, an operation detector 30, the display 40, and a database 50. The character input device 10 is implemented by, for example, a mobile information processing terminal.

The controller 20 includes a suggestion controller 21 and a display controller 22. The processing performed by the controller 20 will be described later in detail.

The display 40 includes the keypad display area 41, the suggestion display area 42, and the character display area 43. As shown in FIG. 2, the keypad display area 41, the suggestion display area 42, and the character display area 43 are, for example, located on the display screen of the display 40. The keypad display area 41 displays various keys for inputting characters. The suggestion display area 42 displays, for example, predictive conversion suggestions and a symbol (button) detected with a method described later. The character display area 43 displays characters input with the keypad display area 41 and an entered character string.

More specifically, the operation detector 30 is, for example, a touchscreen panel included in the display 40, and detects an operational input into the display 40, or in other words, an operation on the keypad display area 41, the suggestion display area 42, and the character display area 43. The operation detector 30 outputs the operation to the suggestion controller 21 in the controller 20. The operation detector 30 uses a known method for detecting an operation, which will not be described in detail.

The database 50 stores normal predictive conversion suggestions as a set of normal suggestions. The database 50 also stores, as a set of group suggestions, the names of multiple groups each having predetermined different characteristics. The database 50 also stores group databases (group DBs) 511 and 512 associated with the groups (group names). Each of the group databases 511 and 512 stores, as a set of in-group suggestions, multiple conversion suggestions (group conversion suggestions) having the characteristic of the group including the conversion suggestions, and stores a symbol that represents an attribute classifying the multiple group conversion suggestions by a different characteristic.

For example, the groups stored may be Japanese railway companies such as Keihan, Hankyu, or Kintetsu. For the Japanese railway company Keihan, for example, its station names such as Aono, Awazu, and Ishiba are stored as the group conversion suggestions. As the symbol representing the attribute, Station Name Suggestion is stored for the station name. Proper nouns may have unique readings. Thus, the structure according to one or more embodiments are more advantageous for the group conversion suggestions that are proper nouns such as the station names described above.

The character input device 10 with the above structure detects and displays predictive conversion suggestions in the manner described below.

In response to the user (character inputter) operating the keypad display area 41 to input Japanese hiragana characters (reading of a character string), the operation detector 30 detects the character input operation and outputs the operation to the suggestion controller 21.

The suggestion controller 21 detects the reading of the input characters based on the detection result of the operational input. The suggestion controller 21 outputs the detected reading to the display controller 22. The display controller 22 displays the reading in the character display area 43.

The suggestion controller 21 uses the detected reading to detect and obtain predictive conversion suggestions in the set of normal suggestions at least partially matching the detected reading.

The suggestion controller 21 also detects a group (group name) at least partially matching the reading. The suggestion controller 21 that has successfully detected the group refers to the group database associated with the detected group and detects and obtains the symbol representing the attribute included in the detected group.

The suggestion controller 21 outputs the obtained predictive conversion suggestions in the set of normal suggestions and the obtained symbol representing the attribute to the display controller 22.

The display controller 22 displays the predictive conversion suggestions in the set of normal suggestions and the symbol representing the attribute in the suggestion display area 42 (refer to the left part of FIG. 2). The display controller 22 may display the symbol at a predetermined position in the suggestion display area 42. The user can easily and reliably view the symbol appearing at the predetermined position.

When the suggestion controller 21 detects selection of a predictive conversion suggestion in the set of normal suggestions based on the detection result from the operation detector 30 detecting an operation on the suggestion display area 42, the suggestion controller 21 outputs the selected predictive conversion suggestion to the display controller 22. The display controller 22 outputs the selected predictive conversion suggestion, instead of the reading, to the character display area 43, which enters the conversion based on the predictive conversion suggestions in the set of normal suggestions.

When the suggestion controller 21 detects selection of the symbol representing the attribute based on the detection result from the operation detector 30 detecting an operation on the suggestion display area 42, the suggestion controller 21 obtains group conversion suggestions in the group DB associated with the symbol. The suggestion controller 21 outputs the obtained group conversion suggestions to the display controller 22.

The display controller 22 displays the group conversion suggestions in the suggestion display area 42, instead of the predictive conversion suggestions in the set of normal suggestions and the symbol representing the attribute (refer to the right part of FIG. 2).

When the suggestion controller 21 detects selection of a group conversion suggestion based on the detection result from the operation detector 30 detecting an operation on the suggestion display area 42, the suggestion controller 21 outputs the selected group conversion suggestion to the display controller 22. The display controller 22 outputs the selected group conversion suggestion, instead of the reading, to the character display area 43, which enters the conversion based on the group conversion suggestions.

As described above, the structure and the method according to the present embodiment allow the user who does not remember an intended character string to more reliably input the intended character string by simply inputting the group name of the character string and selecting the attribute.

In the example shown in FIG. 2, in response to the user inputting Japanese hiragana characters Keihan, the character display area 43 in the display 40 displays the Japanese hiragana characters Keihan (yet to be entered). The suggestion display area 42 displays normal predictive conversion suggestions for Keihan, which are kanji character strings Kanji 1 and Kanji 2, and the symbol Station Name Suggestion representing the attribute Station Name of the group Keihan (refer to the left part of FIG. 2). A more specific symbol, such as Station Name of Keihan, may be used instead of Station Name Suggestion. For example, among other suggestions appearing, the more specific symbol allows the user to easily find the symbol and thus more reliably display intended predictive conversion suggestions (or station names of Keihan in the present example).

In response to the user selecting the symbol Station Name Suggestion in the present state, the suggestion display area 42 displays group conversion suggestions associated with the attribute Station Name of the group Keihan, such as Aono, Awazu, and Ishiba in kanji character strings, together with the reading of each kanji character string (refer to the right part of FIG. 2).

Displaying suggestions allows the user who does not remember but intends to input the character string Awazu to input the character string Awazu by inputting the Japanese hiragana characters Keihan.

Although each group conversion suggestion appears together with its reading in the example described above, the reading may be eliminated. The reading appearing together with the kanji character string allows more reliable input of intended Japanese hiragana characters (reading of a character string) in subsequent input operations.

The group conversion suggestions appear in the suggestion display area 42 with a back button 423 displayed by the display controller 22 (refer to the right part of FIG. 2). In response to the back button 423 being operated, the suggestion controller 21 controls the display controller 22 to display the previous predictive conversion suggestions in the set of normal suggestions. The display controller 22 then displays the previous predictive conversion suggestions in the set of normal suggestions in the suggestion display area 42.

Figure 3:
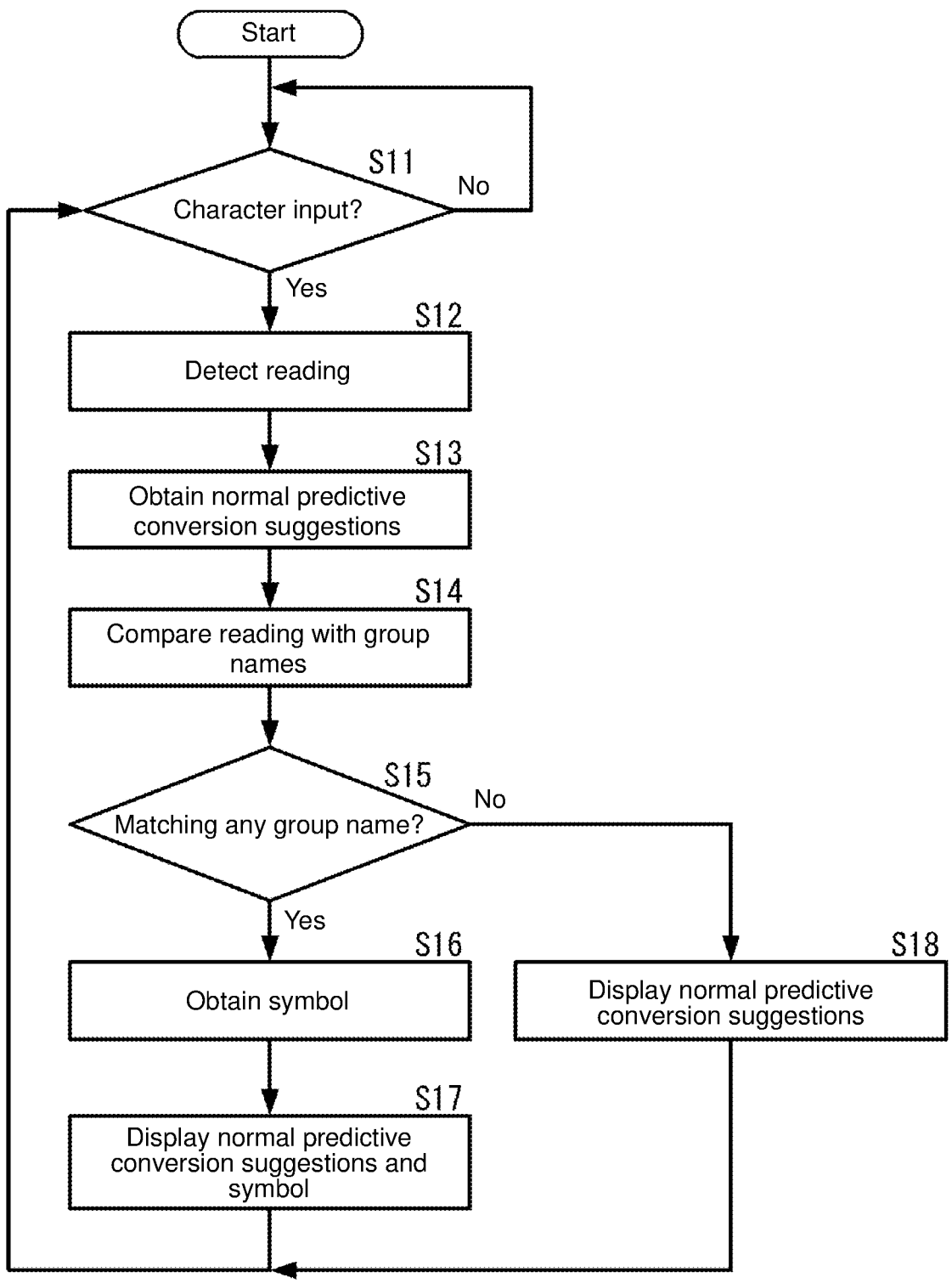
FIG. 3 is a flowchart illustrating the character input method according to a first embodiment.
Figure 4:
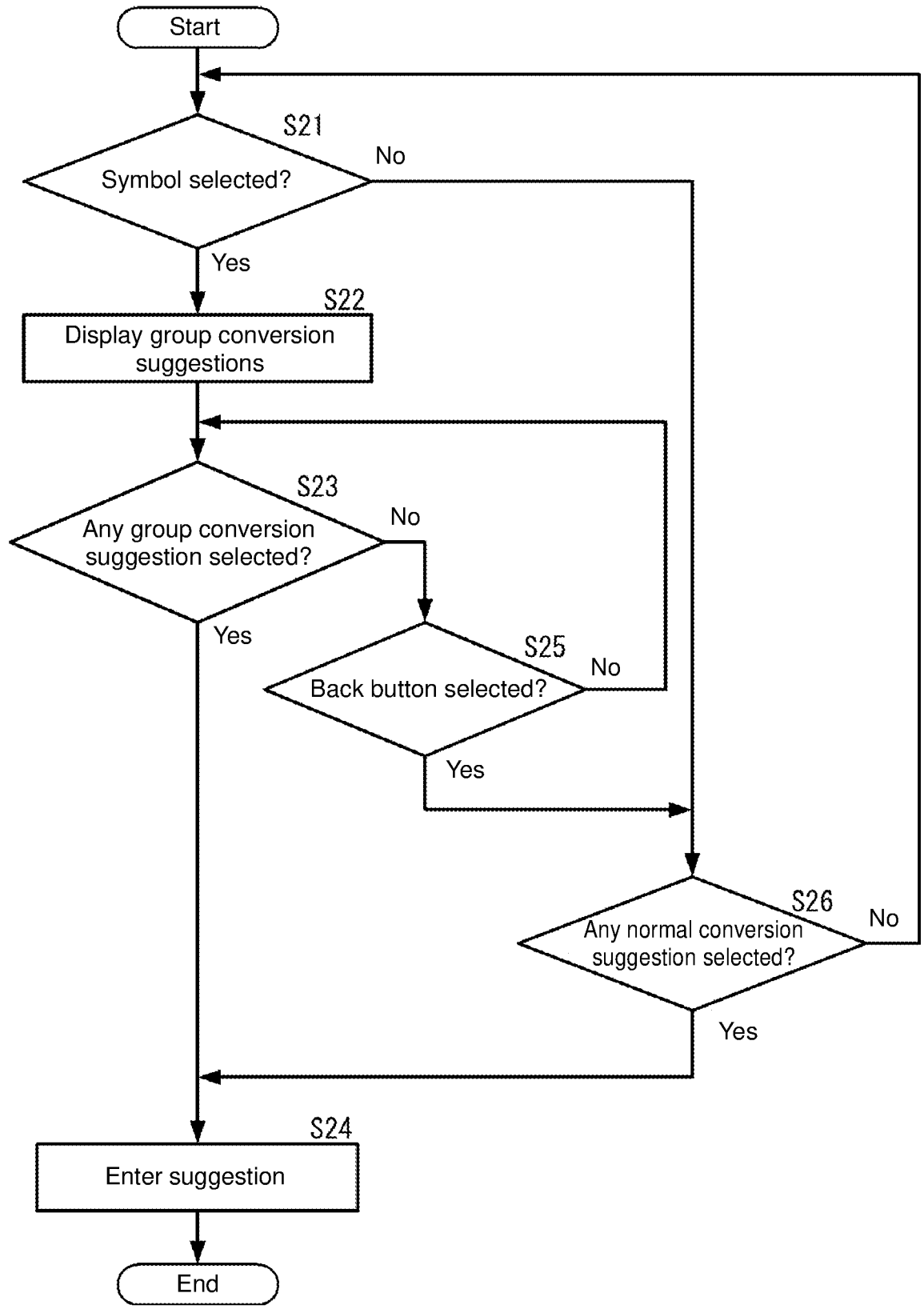
FIG. 4 is a flowchart illustrating the character input method according to a first embodiment.

To perform the above processing, for example, the controller 20 in the character input device 10 performs the procedures shown in FIGS. 3 and 4. FIGS. 3 and 4 are flowcharts illustrating the character input method according to a first embodiment.

As shown in FIG. 3, in response to an input of Japanese hiragana characters (reading of a character string) (Yes in S11), the controller 20 detects the reading (S12). The controller 20 maintains an input standby state until receiving an input of Japanese hiragana characters (reading of a character string) (No in S11).

The controller 20 obtains normal predictive conversion suggestions matching the reading (S13). The controller 20 compares the reading with the group names (S14).

In response to the reading matching any of the group names (Yes in S15), the controller 20 obtains the symbol associated with the group name (S16). The controller 20 that has obtained the symbol displays the normal predictive conversion suggestions and the symbol (517).

In response to the reading matching no group name (No in S15), the controller 20 simply displays the normal predictive conversion suggestions (S18).

As shown in FIG. 4, in response to selection of the symbol (Yes in S21), the controller 20 obtains and displays group conversion suggestions (S22).

In response to selection of a group conversion suggestion (Yes in S23), the controller 20 enters the selected conversion suggestion (S24). In response to selection of the back button (Yes in S25) without selection of any group conversion suggestion (No in S23), the controller 20 displays the normal predictive conversion suggestions again. In response to selection of a normal predictive conversion suggestion (Yes in S26), the controller 20 enters the selected suggestion (S24).

For no back button being selected (No in S25), the controller 20 maintains a standby state for selection of a group conversion suggestion. For no normal predictive conversion suggestion being selected (No in S26), the controller 20 maintains a standby state for the selection.

Second Embodiment

A character input technique according to a second embodiment differs from the character input technique according to a first embodiment in including multiple attributes. The other components associated with the character input technique according to a second embodiment are the same as for the character input technique according to a first embodiment and will not be described.

Figure 5:
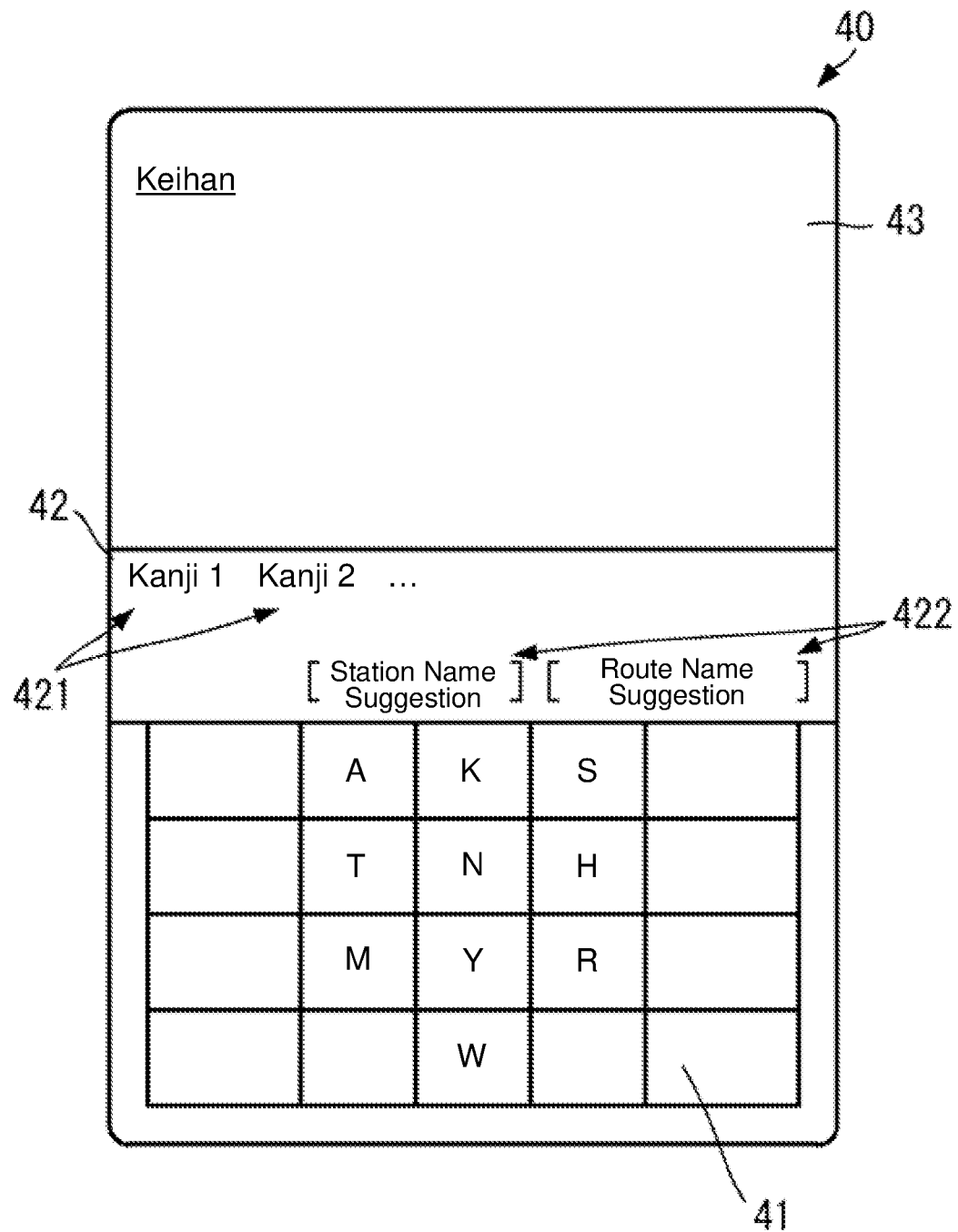
FIG. 5 is a diagram illustrating an example display with a character input method according to a second embodiment.

FIG. 5 is a diagram illustrating an example display with a character input method according to a second embodiment.

As shown in FIG. 5, symbols 422 representing multiple attributes appear for the reading in a second embodiment. For example, for the group that is a railway company as described above, multiple attributes Station Name and Route Name are associated with the group and two symbols Station Name Suggestion and Route Name Suggestion are stored to respectively represent the attributes Station Name and Route Name.

In response to the user inputting Japanese hiragana characters (reading of a character string) that match the group name, the symbols Station Name Suggestion and Route Name Suggestion appear together with normal predictive conversion suggestions as shown in FIG. 5. In response to selection of the symbol Station Name Suggestion, a set of station names appears as group conversion suggestions as described above. In response to selection of the symbol Route Name Suggestion, a set of route names appears as group conversion suggestions.

The above described structure allows the user to more reliably input an intended character string.

Third Embodiment

A character input technique according to a third embodiment differs from the character input technique according to a first embodiment in that attributes are classified into levels. The other components associated with the character input technique according to a third embodiment are the same as for the character input technique according to a first embodiment and will not be described.

Figure 6:
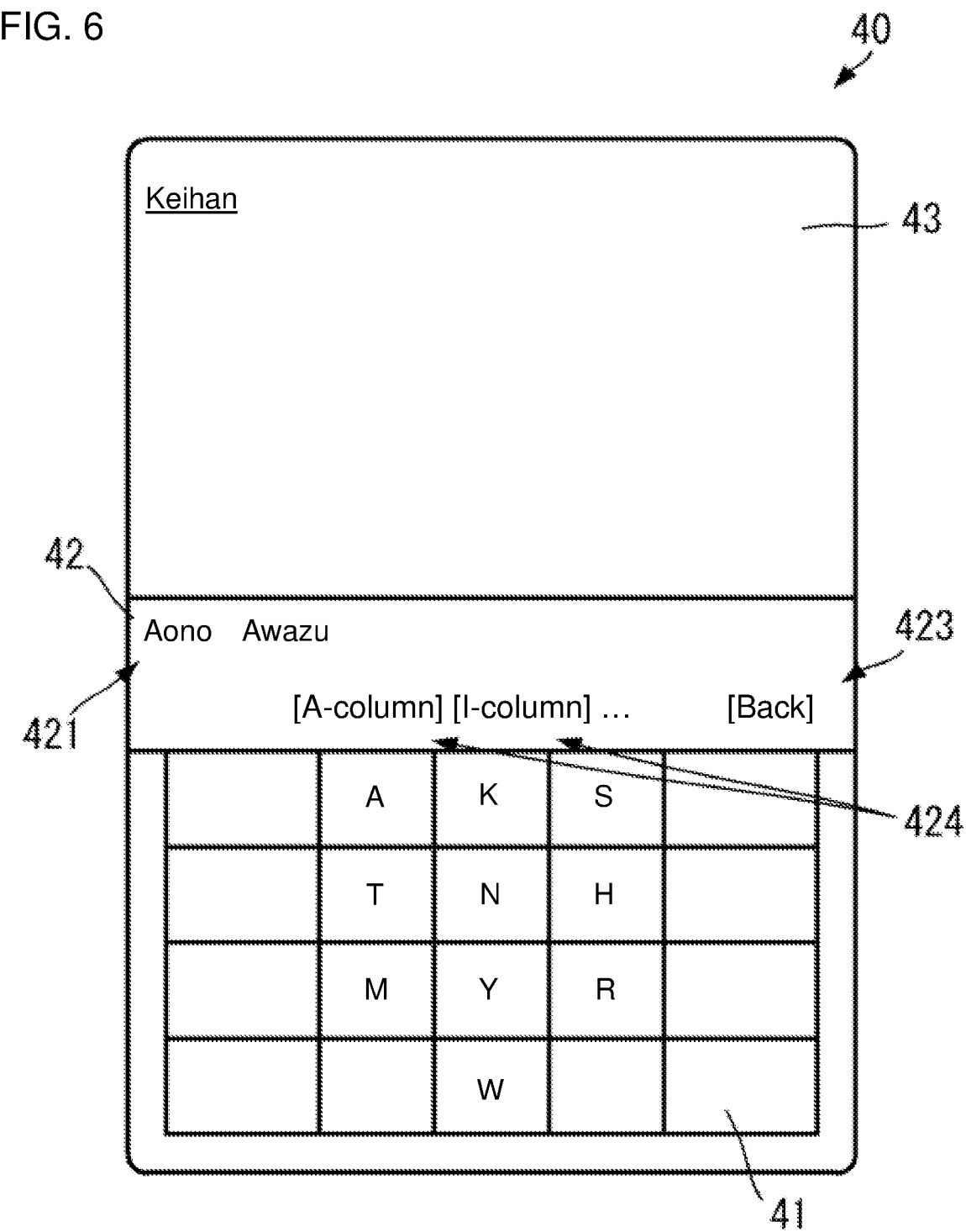
FIG. 6 is a diagram illustrating an example display with a character input method according to a third embodiment.

FIG. 6 is a diagram illustrating an example display with a character input method according to a third embodiment. As in the right part of FIG. 2, FIG. 6 shows the display on which the symbol Station Name Suggestion is selected.

In response to the user selecting the symbol Station Name Suggestion on the display shown in the left part of FIG. 2, multiple station names that are group conversion suggestions appear, together with symbols 424 such as Hiragana A-column and Hiragana I-column as shown in FIG. 6. The symbols 424 such as Hiragana A-column and Hiragana I-column represent attributes Hiragana A-column and Hiragana I-column that are in smaller groups (lower attributes) of the attribute Station Name. More specifically, the group conversion suggestions corresponding to the symbol Hiragana A-column are station names having a reading starting with the Japanese hiragana character A, and the group conversion suggestions corresponding to the symbol Hiragana I-column are station names having a reading starting with the Japanese hiragana character I.

The above described arrangement for providing suggestions allows the user to more easily find and more reliably input an intended character string.

Fourth Embodiment

A character input technique according to a fourth embodiment differs from the character input technique according to a first embodiment in that a symbol appears in an emphasized manner. The other components associated with the character input technique according to a fourth embodiment are the same as for the character input technique according to a first embodiment and will not be described.

Figure 7:
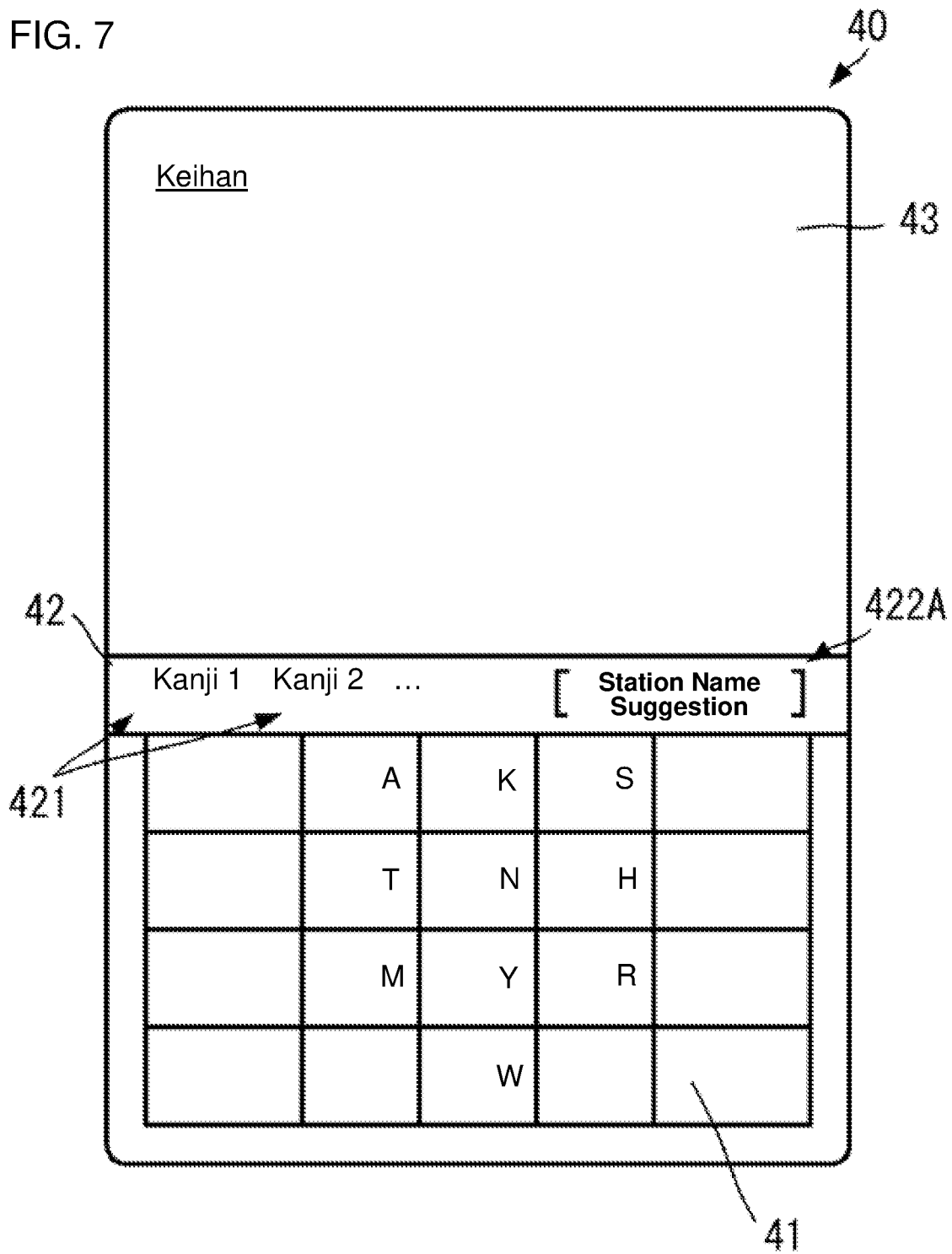
FIG. 7 is a diagram illustrating an example display with a character input method according to a fourth embodiment.

FIG. 7 is a diagram of an example display with a character input method according to a fourth embodiment.

As shown in FIG. 7, the symbol representing the attribute appears in an emphasized manner in a fourth embodiment. Appearing in an emphasized manner refers to, for example, appearing in bold and appearing with a font different from the font for normal predictive conversion suggestions. Any emphasized manner may be used for displaying a symbol representing an attribute differently from normal predictive conversion suggestions.

Emphasizing symbols in the above described manner, allows the user to easily view input Japanese hiragana characters (reading of a character string) matching an attribute.

Fifth Embodiment

A character input technique according to a fifth embodiment differs from the character input technique according to a first embodiment in that a front portion of Japanese hiragana characters is matched to obtain conversion suggestions. The other components associated with the character input technique according to a fifth embodiment are the same as for the character input technique according to a first embodiment and will not be described.

Figure 8:
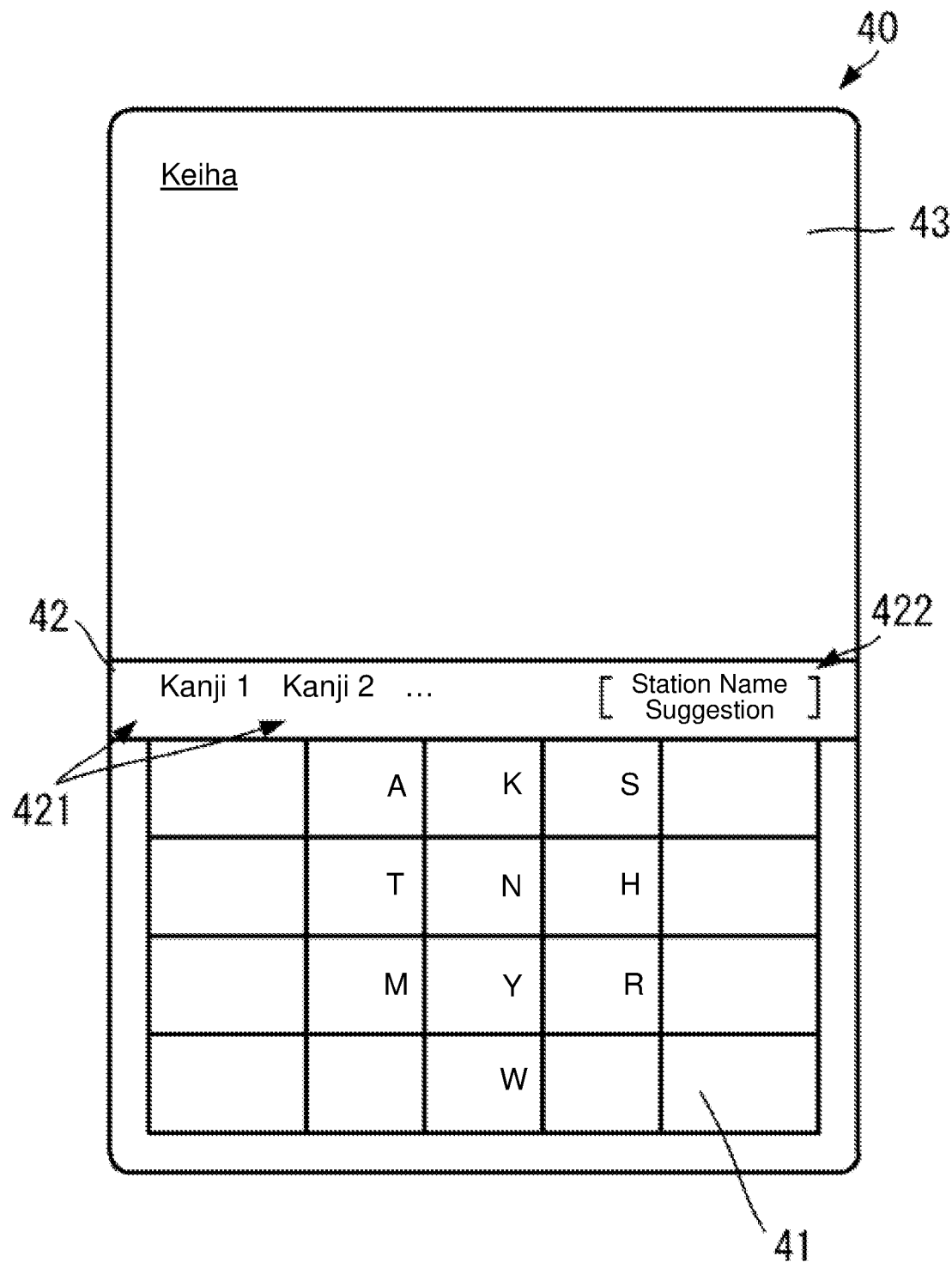
FIG. 8 is a diagram illustrating an example display with a character input method according to a fifth embodiment.

FIG. 8 is a diagram of an example display with a character input method according to a fifth embodiment.

As shown in FIG. 8, in response to the user inputting Japanese hiragana characters (reading of a character string), normal predictive conversion suggestions including the input Japanese hiragana characters (reading of a character string) appear. At the same time, group names including the Japanese hiragana characters (reading of a character string) are detected, and the symbol representing the attribute of the group appears. In other words, in a fifth embodiment, the symbol representing the attribute appears in response to the reading at least partially matching the group name.

The above described structure displays the symbol representing the attribute and then allows the user to input an intended character string before the user inputs the complete group name.

Sixth Embodiment

A character input technique according to a sixth embodiment differs from the character input technique according to a first embodiment in that group names and symbols are listed. The other components associated with the character input technique according to a sixth embodiment are the same as for the character input technique according to a first embodiment and will not be described.

Figure 9:
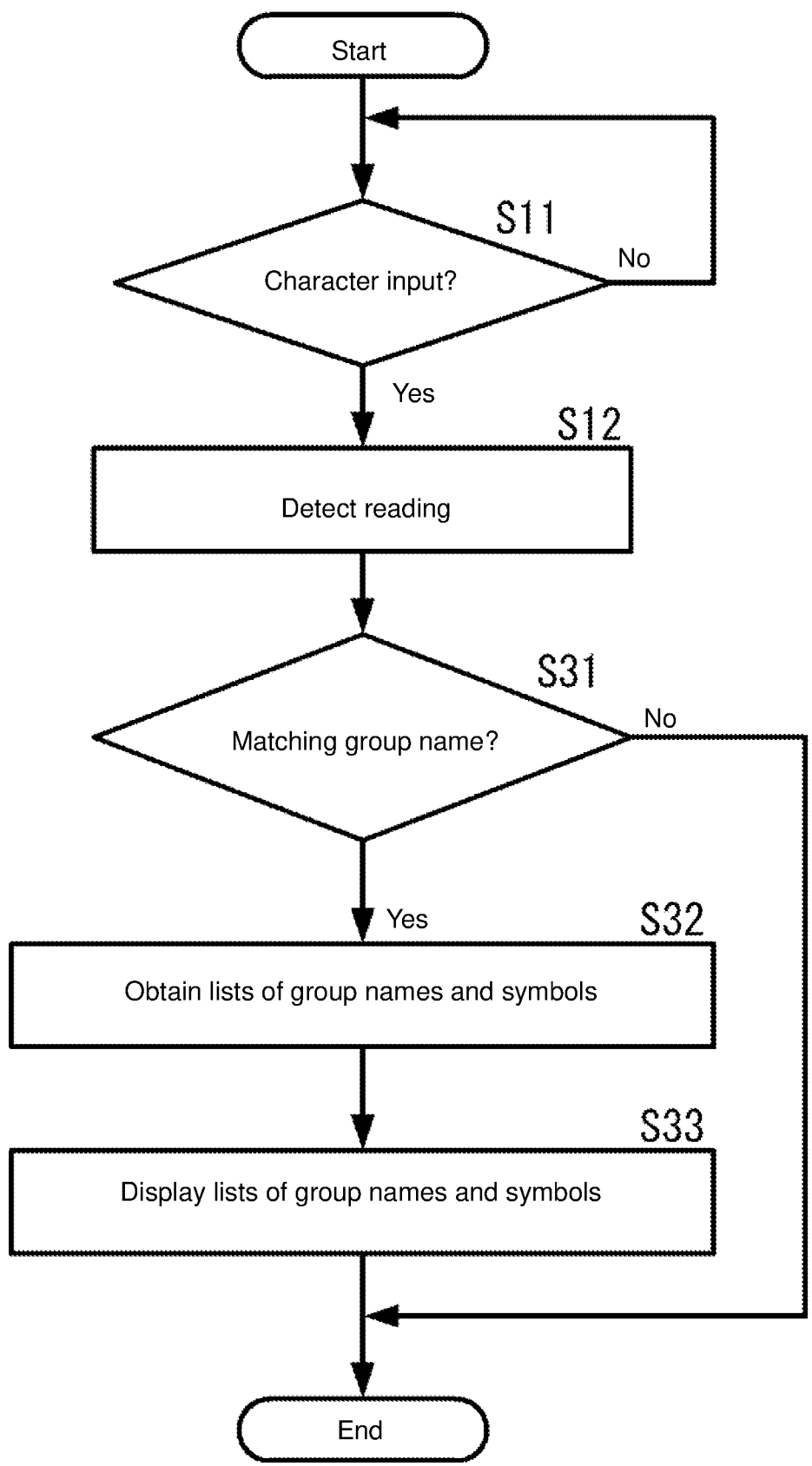
FIG. 9 is a flowchart illustrating a character input method according to a sixth embodiment.

FIG. 9 is a flowchart illustrating a character input method according to a sixth embodiment.

As shown in FIG. 9, in response to detection of the reading (S12) after the user inputs Japanese hiragana characters (Yes in S11), the controller 20 searches for a group name using the reading (S31).

In response to the reading matching a group name (Yes in S31), the controller 20 obtains lists of group names matching the reading and of symbols representing the attributes of the groups (S32). The controller 20 displays the obtained lists of the group names and of the symbols representing the attributes of the groups (S33).

The above described display of lists allows the user to collectively view group names matching the input Japanese hiragana characters (reading of a character string) and symbols representing the attributes. The user may thus easily find an intended character string.

The database 50 is included in an information processing terminal in the above embodiments. However, the database 50 may be located externally to the information processing terminal, for example, on a network. The suggestion controller 21 in the controller 20 may also be at least partially located externally to the information processing terminal (e.g., on a network).

The above structures and methods according to one or more embodiments may be combined as appropriate to produce advantageous effects depending on each combination.

APPENDIX

A character input device for inputting a character, the device may comprise: a database storing a normal predictive conversion suggestion, a group including a plurality of group conversion suggestions each having a common element, and a symbol representing an attribute, the attribute classifying the plurality of group conversion suggestions by a characteristic different from the common element in the group; and a suggestion controller configured to detect a reading of an input character and detect, in response to the reading of the input character at least partially matching a name of the group, the symbol representing the attribute of the group.

The character input device may further comprise: a display controller configured to display a normal predictive conversion suggestion detected by the suggestion controller on a display screen, wherein the display controller displays the normal predictive conversion suggestion and the symbol.

The suggestion controller may detect the plurality of group conversion suggestions associated with the attribute of the group in response to the symbol being selected, and the display controller displays the plurality of group conversion suggestions detected by the suggestion controller.

The display controller may display readings of the plurality of group conversion suggestions.

The display controller may display the symbol at a predetermined position on the display screen.

The display controller may display the symbol in an emphasized manner.

The suggestion controller may detect, in response to the reading of the input character matching a plurality of attributes of a single group, symbols representing the plurality of attributes.

The database may store the attribute classified into levels.

The plurality of group conversion suggestions may be proper nouns.

The invention claimed is:

1. A character input device for inputting a character, the device comprising:
   a database storing:
      normal predictive conversion suggestions;
      a group comprising a plurality of group conversion suggestions, each being associated with a common element of the group; and
      a symbol representing an attribute classifying the plurality of group conversion suggestions by a characteristic different from the common element of the group;
   a processor configured with a program to perform operations comprising:
      operation as a suggestion controller configured to detect a reading of an input character and detect, in response to the reading of the input character at least partially matching a name of the group, the symbol representing the attribute of the group;
      operation as a display controller configured to:
      display at least one of the normal predictive conversion suggestions, corresponding to the input character; and
      in response to the suggestion controller detecting the symbol, display the symbol; and
   an operation detector, comprising a touchscreen, configured to receive a selection of one of the at least one normal predictive conversion suggestions or a selection of the symbol, wherein
      the processor is configured with the program such that operation as the display controller further comprises, in response to receiving, via the operation detector, the selection of the symbol, displaying the group conversion suggestions.

2. The character input device according to claim 1, wherein
   the processor is configured with the program such that operation as the display controller comprises displaying readings of the plurality of group conversion suggestions.

3. The character input device according to claim 1, wherein
   the processor is configured with the program such that operation as the display controller comprises displaying the symbol at a predetermined position on the display screen.

4. The character input device according to claim 1, wherein
   the processor is configured with the program such that operation as the display controller comprises displaying the symbol in an emphasized manner.

5. The character input device according to claim 1, wherein
   the processor is configured with the program such that operation as the suggestion controller comprises detecting, in response to the reading of the input character matching a plurality of attributes of a single group, symbols representing the plurality of attributes.

6. The character input device according to claim 1, wherein
   the database stores the attribute classified into levels.

7. The character input device according to claim 1, wherein
   the plurality of group conversion suggestions are proper nouns.

8. The character input device according to claim 2, wherein
   the processor is configured with the program such that operation as the display controller comprises displaying the symbol at a predetermined position on the display screen.

9. The character input device according to claim 2, wherein
   the processor is configured with the program such that operation as the display controller comprises displaying the symbol at a predetermined position on the display screen.

10. The character input device according to claim 5, wherein
    the processor is configured with the program such that operation as the display controller comprises displaying the symbol in an emphasized manner.

11. The character input device according to claim 2, wherein
    the processor is configured with the program such that operation as the display controller comprises displaying the symbol in an emphasized manner.

12. The character input device according to claim 3, wherein
    the processor is configured with the program such that operation as the display controller comprises displaying the symbol in an emphasized manner.

13. The character input device according to claim 2, wherein
    the processor is configured with the program such that operation as the suggestion controller comprises detecting, in response to the reading of the input character matching a plurality of attributes of a single group, symbols representing the plurality of attributes.

14. The character input device according to claim 3, wherein
    the processor is configured with the program such that operation as the suggestion controller comprises detecting, in response to the reading of the input character matching a plurality of attributes of a single group, symbols representing the plurality of attributes.

15. The character input device according to claim 2, wherein
    the database stores the attribute classified into levels.

16. The character input device according to claim 2, wherein
    the plurality of group conversion suggestions are proper nouns.

17. A character input method for detecting, with a computer, a predictive conversion suggestion for an input character, the method comprising:
- detecting a reading of the input character;
- detecting matching between the reading of the input character and a group stored in a database, the group including a plurality of group conversion suggestions each being associated with a common element of the group;
- detecting, in response to the reading of the input character at least partially matching a name of the group, a symbol representing an attribute of the group classifying the plurality of group conversion suggestions by a characteristic different from the common element of the group;
- displaying at least one normal predictive suggestion corresponding to the input character;
- in response to detecting the symbol, displaying the symbol; and
- in response to receiving, via a touchscreen, a selection of the symbol, displaying the group conversion suggestions.

18. A non-transitory computer-readable storage medium storing a character input program for causing a computer to detect a predictive conversion suggestion for an input character, which when read and executed, causes the computer to perform operations comprising:
- detecting a reading of the input character;
- detecting matching between the reading of the input character and a group stored in a database, the group including a plurality of group conversion suggestions each being associated with a common element of the group;
- detecting, in response to the reading of the input character at least partially matching a name of the group, a symbol representing an attribute of the group classifying the plurality of group conversion suggestions by a characteristic different from the common element of the group;
- displaying at least one normal predictive suggestion corresponding to the input character;
- in response to detecting the symbol, displaying the symbol; and
- in response to receiving, via a touchscreen, a selection of the symbol, displaying the group conversion suggestions.

* * * * *